3,464,997
SYNTHESIS OF 3-QUINUCLIDINOL
Herbert S. Aaron, Baltimore, Omer O. Owens, Abingdon, and Jacob I. Miller, Baltimore, Md., assignors to the United States of America as represented by the Secretary of the Army
No Drawing. Filed Mar. 17, 1966, Ser. No. 536,583
Int. Cl. C07d 39/06
U.S. Cl. 260—294.7      6 Claims

ABSTRACT OF THE DISCLOSURE

This invention relates to azabicyclic alcohols and to the process of preparing them. More particularly, it relates to the synthesis of 3-quinuclidinol, by the cyclodehydration of (4-piperidyl)-1,2-ethanediol.

---

3-quinuclidinol has previously been prepared as disclosed in Patent No. 2,648,667 by being synthesized from appropriate pyridine compounds.

The processes reported in the literature, however, present disadvantages, such as complex reactions, low end product yields or the employment of expensive starting materials.

Our invention overcomes these disadvantages and provides a simple process of preparing an azabicyclic alcohol or a bridged ring alcohol, by treating 4-vinylpyridine with an oxidizing agent or to be more specific—an hydroxylating agent to form (4-pyridyl)-1,2-ethanediol, said glycol being acidified with a mineral acid thus forming a glycol salt. This salt in turn is catalytically hydrogenated to the corresponding piperidyl glycol hydrochloride which is converted to the free base piperidyl glycol wherein said compound is heated in the presence of an activated catalyst producing 3-quinuclidinol.

The compound possesses utility in the field of medicinals and more particularly in the class of spasmolytics. Moreover, the simplicity and results of our cyclodehydration study suggest that the method may be of synthetic utility as a general route to other azabicyclic alcohols.

Our process can be represented by the following equations:

An object of the invention is to provide an economically and commercially feasible method of producing an azabicyclic alcohol.

Another object of the invention is to provide a new procedure for the synthesis of 4-piperidylethylene glycol.

Another object of the invention is to produce the novel compound 4-pyridylethylene glycol.

Another object of the invention is to produce the novel compound 4-piperidylethylene glycol and its hydrochloride salt.

A further object of the invention relates to the synthesis of 3-quinuclidinol from an inexpensive, commercial starting material 4-vinylpyridine.

While we have succeeded in discovering a new and simple method for producing azabicyclic alcohols, we have also discovered a new method for producing the new intermediate compound 4-pyridylethylene glycol (II) and its hydrochloride salt and the new compound (4-piperidyl)-1,2-ethanediol (III) and its hydrochloride salt. Intermediate glycols, particularly the pyridyl glycols, are produced by complex processes disclosed in Patents 2,743,277 and 2,971,000. However, the manner in which we are able to produce 4-pyridyl glycols is entirely different from the methods disclosed in the above cited patents as can be seen by our invention disclosed herein.

The pyridyl glycols are known to be very useful in the manufacture of certain types of synthetic fibers. One of the newer and more acceptable synthetic fibers, Dacron, has had its dyeing capabilities greatly enhanced by employing pyridyl glycols in its molecular makeup.

We have found that in the cyclodehydrating step that oxides of aluminum, barium, calcium, strontium, and magnesium can be used as the catalyst. We have further found that aluminum oxides are the best ones to use and that Woelm basic alumina is to be preferred.

In the hydroxylation step potassium permanganate, osmium tetroxide, or other known hydroxylation reagents may be used. We prefer to use potassium permanganate.

Our invention is further disclosed in the following procedure, which is illustrative of the invention, but not limitative thereof, since equivalents will be obvious to those skilled in the art.

Preferably stoichiometric proportions of the reactants are employed.

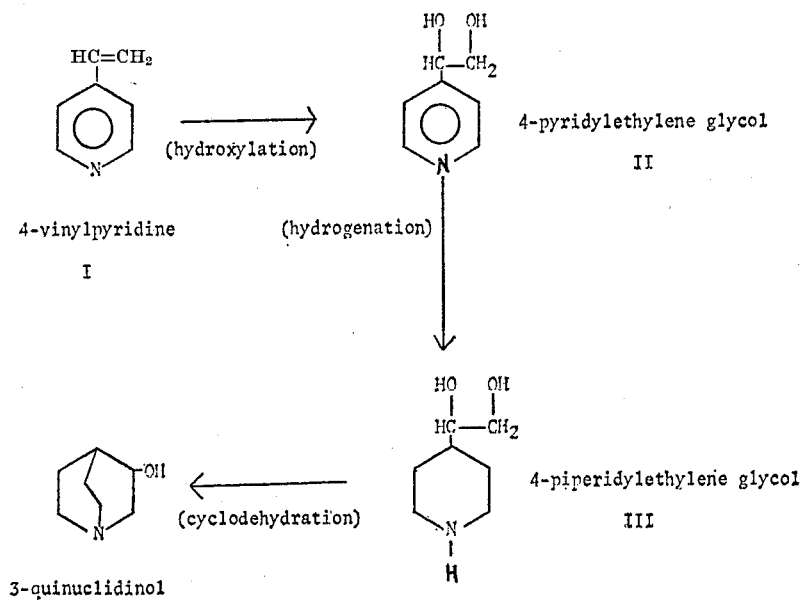

EXAMPLE 1

(4-pyridyl)-1,2-ethanediol (II)

Potassium permanganate (52.6 g., 0.33 mole) in 1.5 liters of water was added dropwise, over a two hour period, to 4-vinylpyridine (I) (52.5 g., 0.5 mole) in 450 ml. of water. During the addition, the reaction mixture was stirred vigorously and cooled in an external bath to maintain a reaction temperature of 2 to 4° C. After the addition, the mixture was allowed to stand overnight at ambient temperature. The manganese dioxide was filtered (glass sintered funned), and washed several times with hot water (50 ml. per wash). The washings and filtrate were combined and extracted with three 500 ml. portions of ether. On evaporation of the combined ether washings, 7 g. of vinylpyridine was recovered. The aqueous solution was acidified (pH 1) with concentrated hydrochloric acid and the resultant solution was evaporated to dryness under reduced pressure. Methanol (200 ml.) was added to the light yellow solid residue and a potassium hydroxide-methanol solution (10 to 15%) was added to the stirred suspension until pH 9 is obtained. The mixture was filtered and the potassium chloride filter cake was washed several times with acetone. The acetone washings were combined with the methanol filtrate and the solvents were removed under reduced pressure. The dark, viscous, oily residue was dissolved in warm acetone (600 ml.) and filtered from the residual potassium chloride. After removing the acetone on a steam bath, the pink residue was recrystallized several times by dissolving the product in hot acetone-benzene (1:1, decolorizing with charcoal, filtering and concentrating the filtrate to approximately one-half of its original volume. The solution was seeded (cited below) and allowed to cool slowly to ambient temperature, with occasional swirling. In this way, the pure product (II), 21.2 g. (35%, based on recovered starting material), M.P. 71–73° (dec.), was obtained.

Analysis.—Calcd. for $C_7H_9NO_2$: C, 60.42; H, 6.52; O, 23.00; Equiv. Wt., 139.2. Found: C, 60.3; H, 6.4; O, 22.8; Equiv. Wt., 140 ($pK_a$ 4.90; 0.015μ).

Its infrared spectrum (dilute solution) showed a single, unresolved, broad (3550–3675 cm.$^{-1}$ at its base), O—H stretching band with a maximum at 3625 cm.$^{-1}$.

Attempts to distill the glycol led to extensive decomposition. However, a small quantity of the product distilled as an extremely viscous yellow oil, B.P. 142–145° (<1μ). The distillate which gave a correct analysis, crystallized on standing at ambient temperature to form a waxy solid. Recrystallization from ether-acetone (1:1) gave product, M.P. 70–72°, which was used as the seed crystals, referred to above.

EXAMPLE 2

(4-pyridyl)-1,2-ethanediol hydrochloride

The acidified (pH 1) aqueous solution obtained from the oxidation of 52 g. of 4-vinylpyridine (recited above) was concentrated under reduced pressure to about 100 ml. The potassium chloride which precipitated was filtered and the filtrate was allowed to evaporate spontaneously to dryness. The solid residue (50 g.) that contained some potassium chloride was recrystallized from ethanol to give 47 g. (0.27 mole, 54%) of the hydrochloride of II, M.P. 126–130°. Recrystallization from isopropyl alcohol gave a product, M.P. 131–133°; Equiv. Wt., 179 (theory, 175.6).

EXAMPLE 3

(4-piperidyl)-1,2-ethanediol (III)

The pyridyl glycol hydrochloride (18.3 g., 0.104 mole) in 15 ml. of 1 N hydrochloride acid and 30 ml. of ethanol was hydrogenated in a Parr hydrogenator at approximately 66 p.s.i.g. over platinum dioxide (0.5 g.) at ambient temperature. After four hours, hydrogen uptake ceased. The fact that a total of 30 lbs. had been absorbed (theory 25 lbs.) indicated that 20% hydrogenolysis had probably occurred. The mixture was filtered to remove the catalyst, then concentrated, under reduced pressure on the steam bath. The viscous residue was dissolved in 100 ml. of boiling ethanol. On standing at room temperature, there was obtained 12 g. (64%) of (4-piperidyl)-1,2-ethanediol hydrochloride (III: HCl), M.P. 150°–152°. An analytical sample, M.P. 155–156°, was obtained by recrystallization from isopropyl alcohol.

Analysis.—Calcd. for $C_7H_{16}ClNO_2$: C, 46.28; H, 8.88; O, 17.61; Equiv. Wt., 181.7. Found: C, 46.2; H, 8.8; O, 17.6; Equiv. Wt., 178 ($pK_a$ 10.85 at 0.20μ).

EXAMPLE 4

3-quinuclidinol (IV)

A 13 mm. diameter glass reactor tube was packed with 10 g. of Woelm basic alumina then heated to 300° in a muffle furnace and maintained at that temperature while a stream of nitrogen was passed through at a rate of about 30 ml./min. Then the piperidyl glycol (III), 4.8 g. (0.033 mole) in an open-end glass carrier tube (80 x 10 mm.), was inserted into the reactor tube just to the point where the latter enters the muffle furnace. The apparatus was inclined about 10° downward from the horizontal so that the glycol, when warmed to about 100° with a heating tape, slowly flowed down onto the alumina surface. Product formation was observed a few minutes later, and the reaction was completed in less than 1 hour. The product, which condenses as a viscous liquid in the cold portion of the exit tube, was dissolved in 23 ml. of methanol. Titration of a 1 ml. aliquot of this solution indicated that a 43% yield (total base) is obtained. Gas liquid chromatographic analysis at 240° on a 10 ft. x 0.25 in. column of Carbowax 20–M (15%) on Gas Chrom P (60/80 mesh) at 120 ml./min. helium flow rate indicated a composition of about 80% quinuclidinol (retention time 4.1 min.) about 15% of an unidentified alcohol (from infrared, possibly 1-azabicyclo[2.2.1]heptyl-7-carbinol) (3.7 min.) and a few percent of a second unknown product (2.9 min.). The remaining 22 ml. of the methanol solution was mixed with about 30 ml. of benzene (to azeotrope the water) and the solvents were removed under reduced pressure. The residue was recycled through another hot column, which now contained 3 g. of Woelm neutral alumina at 190–200°. The first condensate (liquid) was collected in a short collector tube (10 mm. diameter), which had been inserted into the column at its point of exit from the furnace. This forerun was removed, and the product then condensed as a solid and was washed out with methanol. The methanol was evaporated, and heptane was added and evaporated to remove residual methanol. The solid that precipitates was collected and gave 1.34 g. (0.0105 mole, 32%) of 3-quinuclidinol, M.P. 205–210°. The product thus obtained from another run melted at 218–220° after trituration with hot heptane, and gave an infrared spectrum (in KBr) which is identical to that of authentic 3-quinuclidinol.

We claim:

1. A process for the production of 3-quinuclidinol which comprises:
   (1) hydroxylating vinylpyridine with a cold aqueous hydroxylating agent at a low temperature,
   (2) acidifying the aqueous solution with a concentrated mineral acid forming an unsaturated glycol salt,
   (3) hydrogenating the unsaturated glycol salt to corresponding saturated glycol hydrochloride salt,
   (4) converting said saturated glycol salt to a free glycol base,
   (5) cyclodehydrating the saturated glycol in the presence of an oxide catalyst taken from the group consisting of aluminum, barium, calcium, strontium, and magnesium at an elevated temperature and recovering 3-quinuclidinol.

2. A process as defined in claim 1 wherein the oxidation reaction is maintained at a reaction temperature of 2 to 4° C.

3. A process as defined in claim 2 employing potassium permanganate as the hydroxylating agent.

4. A process as defined in claim 3 employing concentrated hydrochloric acid and maintaining the aqueous solution at pH 1.

5. A process as defined in claim 4 wherein catalytic reduction takes place at approximately 66 p.s.i.g. in the presence of platinum dioxide at ambient temperature.

6. A process as defined in claim 5 wherein 4-vinylpyridine is oxidized to (4-pyridyl)-1,2-ethanediol and then acidified to form 4-pyridylethylene glycol hydrochloride salt which is then catalytically hydrogenated to the corresponding 4-piperidylethylene glycol salt, said glycol salt being converted to the free base, 4-piperidylethylene glycol, said glycol being treated in the presence of activated alumina, at 300° C. yielding 3-quinuclidinol.

References Cited

UNITED STATES PATENTS

| | | | |
|---|---|---|---|
| 2,743,277 | 4/1956 | Cislak | 260—297 |
| 2,971,000 | 2/1961 | Mathes et al. | 260—297 |
| 3,262,938 | 7/1966 | Hardie et al. | 260—294.7 |

OTHER REFERENCES

Aaron et al.: J. Org. Chem., vol. 30, No. 4 (April 1965), pages 1331–1333.

HENRY R. JILES, Primary Examiner

R. T. BOND, Assistant Examiner

U.S. Cl. X.R.

260—297; 424—267